United States Patent [19]

Villanyi

[11] Patent Number: 4,520,542

[45] Date of Patent: Jun. 4, 1985

[54] HAND OPERABLE TOOL USED IN INSTALLING PISTON ASSEMBLIES INTO AN ENGINE BLOCK

[75] Inventor: Tibor J. Villanyi, Hanahan, S.C.

[73] Assignee: Cummins Engine Company, Inc., Columbus, Ind.

[21] Appl. No.: 532,149

[22] Filed: Sep. 14, 1983

[51] Int. Cl.³ .............................................. B23P 15/10

[52] U.S. Cl. ................................ 29/224; 29/156.5 R; 29/235; 29/451; 269/8; 269/52; 269/285; 269/286

[58] Field of Search .......... 29/222, 223, 224, 156.4 R, 29/156.5 R, 235, 451; 269/47, 52, 285, 286, 8; 428/908.8

[56] References Cited

U.S. PATENT DOCUMENTS

| | | | |
|---|---|---|---|
| 861,342 | 7/1907 | Winter | 29/224 |
| 935,291 | 9/1909 | Boening | 269/8 |
| 1,224,416 | 5/1917 | Rennau | 29/224 |
| 1,447,561 | 3/1923 | Martinelli | 29/224 |
| 1,458,067 | 6/1923 | Linton | 29/222 |
| 1,488,628 | 4/1924 | Watson | 29/224 |
| 1,612,626 | 12/1926 | Fornelius | 29/224 |
| 1,702,914 | 2/1929 | Murphy | 29/222 |
| 1,830,855 | 11/1931 | Russell | 29/224 |
| 1,892,989 | 1/1933 | Koza | 29/222 |
| 1,930,667 | 10/1933 | Sunnen | 29/224 |
| 2,716,272 | 8/1955 | Wenk et al. | 29/224 |
| 3,307,988 | 3/1967 | Berg | 269/8 |
| 3,952,393 | 4/1976 | van Ravenzwaay et al. | 29/156.4 R X |
| 4,052,045 | 10/1977 | Shaddix | 269/47 |
| 4,261,587 | 4/1981 | Keller et al. | 269/285 |

*Primary Examiner*—Howard Goldberg
*Assistant Examiner*—Ronald S. Wallace
*Attorney, Agent, or Firm*—Sixbey, Friedman & Leedom

[57] ABSTRACT

A hand operable tool (10) used in installing pistons and piston rod assemblies (PR) into an engine block (EB) includes magnets (170, 172,232) for securing the device to the engine block and engine dowel pin receiving holes (190,226) for receiving cylinder head dowel pins (200) to accurately and precisely orient and position the tool with respect to an engine block cylinder bore. A method of installing pistons and piston rod assemblies into an engine block utilizing the hand operable tool is also disclosed.

9 Claims, 9 Drawing Figures

HAND OPERABLE TOOL USED IN INSTALLING PISTON ASSEMBLIES INTO AN ENGINE BLOCK

DESCRIPTION

1. Technical Field

The present invention relates, in general, to installing piston and connecting rod assemblies into an engine block, and, more particularly, to a tool and method used in the process of compressing piston rings around pistons and introducing piston assemblies into engine block cylinder bores.

2. Background Art

The introduction of a piston assembly into a cylinder bore of a combustion engine is a complex and awkward process wherein the piston rings must be compressed and seated while the piston assembly is maintained properly oriented and positioned with respect to the engine block cylinder bore. The inherent awkwardness of the parts being handled, as well as the necessity of compressing the piston rings into grooves in the piston with a substantial degree of pressure while simultaneously introducing the piston assembly into the engine block cylinder bore, creates problems in handling and coordination of tools which have not been adequately solved by presently known devices.

The problems associated with the complexity and awkwardness of the process of installing a piston assembly into an engine block cylinder bore are aggravated by a requirement that the installation process be carried out without damaging any of the parts being assembled that might cause blow-by conditions. Therefore, extreme care must be taken not to damage any of these elements as blow-by may detrimentally affect engine efficiency and performance.

While piston assembly installation can be automated, such as disclosed in U.S. Pat. No. 3,952,393 to von Ravenzwaay et al, such machinery tends to be complex, expensive to install and difficult to maintain in a proper operating condition. One particular problem associated with automated machinery involves the extreme difficulty in achieving accurate orientation and positioning of a piston assembly with respect to an engine block cylinder bore during the installation step. In fact, machinery used in such automated processes is generally designed to tolerate some spatial variation between magazines holding the piston assemblies and the engine block cylinder bores. Establishing low tolerances for the spatial variation in automated process machinery may be extremely expensive, and furthermore, may not be maintained during successive operating cycles.

Many of the problems discussed above in connection with automated processes used in installing piston assemblies into an engine block cylinder bore can be avoided by using hand operable tools, such as those tools disclosed in Winter U.S. Pat. No. 861,342, Linton, U.S. Pat. No. 1,458,067, Koza, U.S. Pat. No. 1,892,989 and Wenk et al U.S. Pat. No. 2,716,272. However, the presently known hand operable tools, while not being subject to many of the problems associated with those devices used in automated piston assembly installation processes, have their own problems which have militated against the acceptance of and further development of these tools. For example, a great deal of manual dexterity is required of an assembler to coordinate all of the motions and equipment involved in the installation of piston assemblies into an engine block using these known hand operable tools, and this severely disadvantages them with respect to automated processes. Known hand operable tools often require a piston pusher to install a piston assembly in an engine block, and thus an assembler must coordinate two tools as well as the piston assembly during the installation process. The problems arising as a result of such multi-device coordination are evident, and the dexterity and coordination skills required to operate these known hand operable tools must be acquired thereby necessitating some sort of assembler training. Such assembler training may be expensive in terms of time as well as in terms of economics, and some assemblers will still not be able to execute the installation process steps as well as others thereby creating problems in producing products of uniform quality.

Still a further, and perhaps most serious, drawback to known hand operable piston assembly installation tools arises because such tools usually have no means for accurate orientation and support with respect to the engine block cylinder bore. The accuracy of orientation and placement is dependent upon the skill and eye of the assembler, and can then be lost due to the lack of means for supporting the hand operable tool once it has been located and oriented thereby creating problems of uniform production as well as the above discussed acquired-skill related problems. In addition, the lack of any orienting and supporting means on known hand operable tools slows the installation process as an assembler must orient and support the tools while manipulating all of the elements associated with the piston assembly installation process.

Most designers of prior art hand operable tools have been concerned with the ease with which the piston rings can be seated, and have not tended to recognize that a problem may arise because the tools cannot be accurately, reliably, precisely and easily oriented and supported with respect to the engine block cylinder bore. Since such problems have not been generally recognized, the prior hand operable tools certainly do not account for such problems.

Accordingly, there is need for a hand operable tool used in installing piston assemblies into an engine block which overcomes the problems of the known hand operable tools so that hand operable tools can be used to install a piston assembly into an engine block while meeting the requirements of modern engine technology and manufacture.

DISCLOSURE OF THE INVENTION

It is a primary object of the present invention to provide a novel and improved hand operable tool and method used in installing a piston in an engine block which permits accurately and precisely orienting and locating a piston assembly with respect to an engine block cylinder bore and which has the hand operable tool attachable to the engine block. The hand operable tool includes mounting means thereon for attaching the apparatus to an engine block and accurately and precisely orienting and locating the hand operable tool with respect to an engine block cylinder bore. Accurate and precise location and orientation of the hand operable tool is automatically accomplished by the attaching means on the tool and thus there is no need to depend on the skill of an assembler for establishing an accurate and precise position and orientation of the hand operable tool. Furthermore, the mounting means frees the assembler's hands so he can perform additional tasks. The awkwardness and complexity associated with prior hand operable tools is removed by the mounting means of the hand operable tool embodying the present invention. The mounting, orientation and locating of the presently disclosed tool can be effected using essentially one single motion, and thus, the piston assembly process is expeditiously carried out even by an unskilled laborer.

It is a further object of the present invention to provide a novel and improved hand operable tool and method used in installing a piston in an engine block wherein the tool can be quickly and easily attached to an engine block without endangering the piston, the piston rings, the engine block or the engine block adjacent to the cylinder bore. The hand operable tool of the present invention includes a pair of movable jaw portions each having thereon means for receiving an engine dowel pin and at least one permanent magnet. The magnets attach the tool to the engine block in a stable manner, and the means receiving the engine dowel pins are located on the tool to accurately and precisely position and orient that tool with respect to an engine block cylinder bore when the tool is in the closed configuration. The tool includes handles and a hinge which control the movement of a pair of movable jaw portions. The jaw portions surround piston seated piston rings to compress those piston rings against the piston with sufficient pressure to properly seat those piston rings on the pistons.

It is yet a further object of the present invention to provide a novel and improved hand operable tool and method used in installing a piston in an engine block which permits a piston assembly to be moved into an engine block cylinder bore by hand. The need for a piston pusher is eliminated, along with the disadvantages associated with such tool.

It is still another object of the present invention to provide a novel and improved hand operable tool and method used in installing a piston in an engine block wherein the tool is automatically locked in a piston-ring compressing configuration. The hand operable tool of the present invention includes a self-closing lock located on handles used to manipulate the tool. The self-closing lock is adapted to close when the tool has been properly positioned around piston mounted piston rings thereby freeing an assembler's hands to manipulate the tool. The self-closing lock includes a swing arm on one handle with the swing arm being designed to close about a latch pin located on another handle as soon as the tool is in a configuration to compress piston rings with a proper amount of force. In this manner, errors resulting from the exertion of too much or too little force on the piston rings will be avoided.

It is another object of the present invention to provide a novel and improved hand operable tool and method used in installing a piston in an engine block wherein the tool causes the piston mounted piston rings to be compressed gradually as the piston assembly is advanced into an engine block cylinder bore through the tool. The hand operable tool has a tapered bore which is chrome plated to reduce ring friction and surface wear. The tool therefore reduces the possibility of damaging the piston rings and is long lived due to the wear coating. The tapered bore is designed and shaped to compress the piston rings with the proper amount of force when the hand operable tool is in a closed configuration. The taper of and coating on the tool assist the hand installation of the piston assembly.

It is another object of the present invention to provide a novel and improved hand operable tool and method used in installing a piston in an engine block wherein a piston-piston rod assembly having piston rings thereon can be initially located by hand in an engine block cylinder bore prior to seating the piston rings on the piston. Lubricating and positioning the piston rings can also be carried out prior to compressing the piston rings. Once the piston rings have been lubricated and positioned, the tool of the present invention is manually operated to place a pair of movable jaw portions in locked configuration around the piston rings to compress those rings. The tool has means for accurately and precisely orienting and placing the piston assembly with respect to the engine block cylinder bore and for securing the tool to the engine block. Once the tool is secured to the engine block, the piston assembly is accurately and precisely oriented and positioned with respect to the engine block cylinder bore and the piston assembly is easily advanced into the engine block cylinder bore by hand.

These objects are accomplished by providing a hand operable tool and method used in the manual installation of piston assemblies into an engine block wherein a plurality of permanent magnets and a plurality of engine dowel pin receiving holes are located on the tool for accurately and precisely orienting, locating and supporting the tool on an engine block. Cylinder head dowel pins are received in bushings located in the engine dowel pin receiving holes as the permanent magnets pull the tool towards the engine block to orient and locate the tool with respect to the engine block cylinder bore with extreme accuracy and precision. The permanent magnets then affix the accurately and precisely oriented and positioned tool to the engine block. The tool has a self-closing lock to lock the tool in the piston ring compressing configuration and the tool has a coated tapered bore through which the piston and piston rings pass when being installed into the piston cylinder bore of the engine block via a closed tool. The self-closing lock locks the hand operable tool in the closed configuration thereby freeing the assembler's hands to carry out other tasks. A method of installing a piston assembly into an engine block using the hand operable tool includes steps of locating a piston having piston rings thereon in an engine block, surrounding the just-located piston assembly with the hand operable tool and then mounting the hand operable tool on an engine block in accurate and precise orientation and placement with respect to the engine block cylinder bore. Appropriate lubrication and piston ring placement can be carried out prior to surrounding the piston and piston rings with the hand operable tool. Preferably, the hand operable tool and method of the present invention are applied to installing piston assemblies into engine blocks of diesel engines.

BEST MODE FOR CARRYING OUT THE INVENTION

Figures 1, 2, 3:
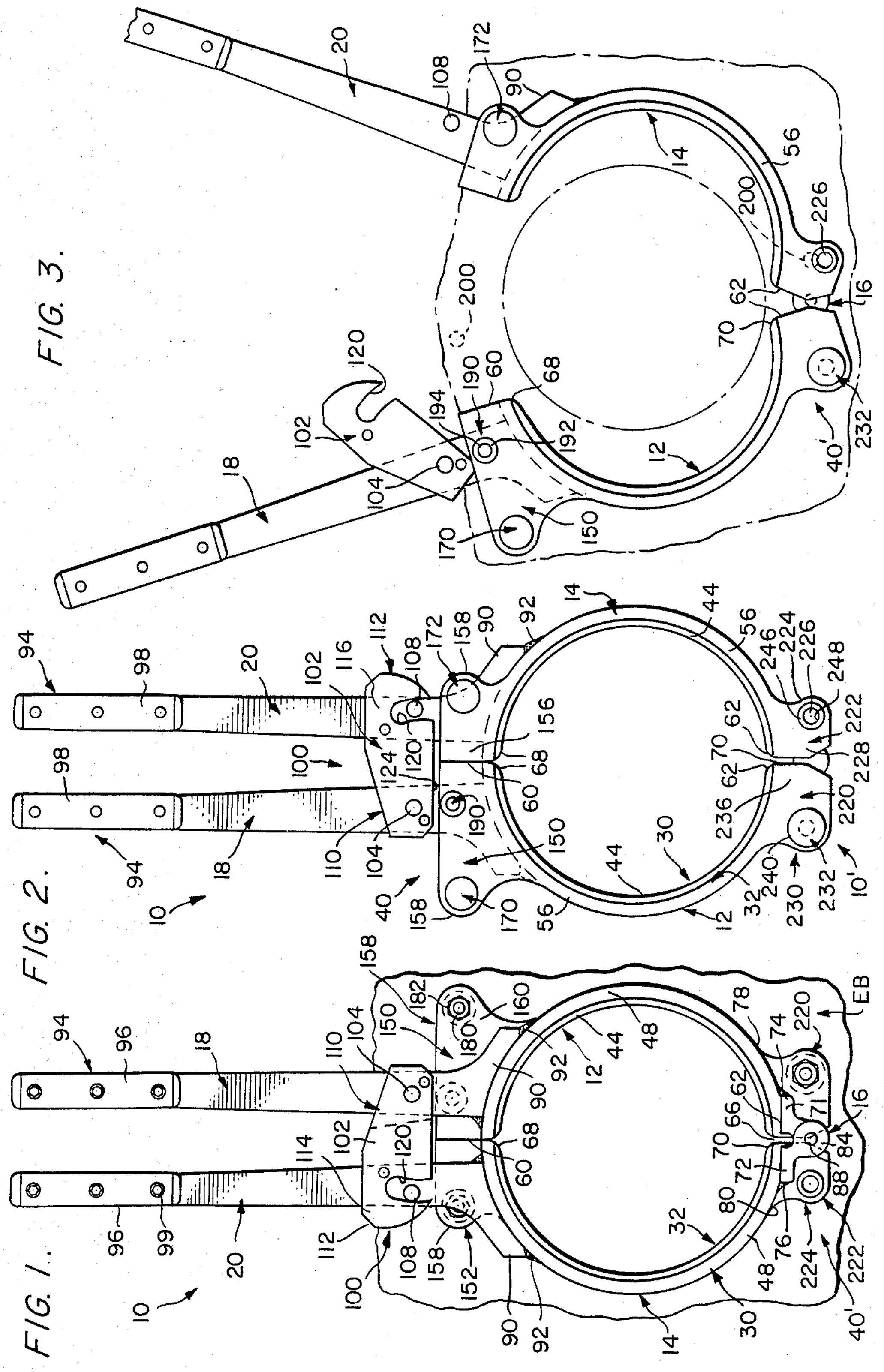
FIG. 1 is a front elevation view of the hand operable tool embodying the teachings of the present invention in the closed configuration.
FIG. 2 is a rear elevation view of the hand operable tool embodying the teachings of the present invention in the closed configuration.
FIG. 3 is a rear elevation view of the hand operable tool embodying the teachings of the present invention in the open configuration.

A tool 10 is hand operable and is shown in FIGS. 1-4 as including a pair of jaw portions 12 and 14 pivotally connected together by a hinge 16 and having handles 18 and 20 respectively thereon for moving the jaw portions 12 and 14 together around a piston to compress piston rings with sufficient force to properly seat those piston rings on the piston. Each of the jaw portions 12 and 14 has an entrance section 30 and an exit section 32, with entrance and exit locations being taken with reference to the movement of a piston through the tool 10 into an engine block cylinder bore. A mounting means 40,40′ attaches the tool 10 to an engine block, and accurately and precisely orients and locates the tool 10 with respect to the engine block cylinder bore so that an assembler's hands are free for moving a piston assembly surrounded by the tool 10 into the engine block cylinder bore, and the assembler need not support the tool 10 while coordinating other tools and activities. However, the mounting means 40,40′ maintains the piston assembly oriented and positioned with respect to that cylinder bore with extreme accuracy and precision.

Each of the jaw portions 12 and 14 is semi-circular in peripheral shape (FIG. 4) and includes a surface 44 which is the inner surface of the respective jaw portion when the tool 10 is closed and which tapers from an entranceway 46 connecting the surface 44 to an entrance section rim 48 to a shoulder 50 which connects the tapered section of the surface 44 to a cylindrical section 54 which extends to an exit section rim 56. The exit section rim 56 is located to be adjacent to an engine block surface when the tool 10 is operatively mounted on an engine block. The surface 44 is coated to reduce piston ring friction and surface wear, and is preferably chrome plated. The taper of surface 44 of jaw portions 12 and 14 causes piston rings seated on a piston being advanced through a closed tool to be gradually compressed as a piston assembly is moved into an engine block cylinder bore liner through tool 10. The length of the tapered section of a closed tool 10, as measured from the entrance section rim 48 to the shoulder 50, as well as the diameter defined by the tapered section at any location thereon, is selected to establish proper piston ring compressing force against a surrounded piston ring while permitting movement of the piston assembly into the entranceway 46, through the closed tool 10, then to and through the exit section 32 of the tool 10.

Each of the jaw portions 12 and 14 includes end edges 60 and 62 extending from the entrance section rim 48 to the exit section rim 56. The end edge 62 of jaw portion 12 is spaced from the corresponding end edge 62 of the jaw portion 14 to establish a gap 66 when the tool 10 is in the closed configuration so the jaw portions 12 and 14 can be hingeably moved with respect to each other into an open configuration for the tool 10 as shown in FIG. 3. The end edges 60 and 62 have rounded shoulders 68 and 70 so that there are no sharp edges located within the circumference of the tool 10 in the closed configuration. Sharp edges may damage a piston ring as a piston assembly is moved through that tool 10, thereby creating a condition wherein blow-by may occur.

The hinge 16 includes a pair of hinge leaves 71 and 72 attached, as by welds 74 and 76, or the like, to surfaces 78 and 80 of the jaw portions 12 and 14 respectively. The surfaces 78 and 80 define the outer surfaces of the jaw portions 12 and 14 respectively when the tool 10 is closed. The hinge 16 further includes a barrel portion 84 having a liner located therein and a pivot pin 88 mounted in the liner. The hinge 16 is mounted on the tool 10 to straddle jaw portion end edges 62 and gap 66 so the tool 10 can be closed with the hinge 16 located beneath a cylindrical piston oriented to have the longitudinal axis thereof extending horizontally, whereby the horizontally oriented piston can be supported in the tool 10 as that tool is being closed about that horizontally oriented piston. Manipulation of the tool 10 with the hinge 16 located beneath a horizontally oriented piston is easier than if the hinge 16 were located to be above or beside such horizontally oriented piston. It is to be noted that while the disclosed orientation for a piston assembly installed using the tool 10 is horizontal, such orientation is not to be considered as limiting.

Each of the handles 18 and 20 is elongate and includes a foot section 90 attached, as by welds 92, or the like, to the jaw portion outer surfaces 78 and 80, and a hand grip 94 on the end of the handle remote from the foot section 90. The hand grip 94 of each handle includes a pair of knurled sections 96 and 98 connected together and to the handle by fastening means, such as socket head screws 99. The handles are used to move the jaw portions 12 and 14 toward and away from each other, and are mounted on the jaw portions 12 and 14 in a location to make the tool 10 balanced and easily manipulated.

A self-closing lock 100 includes a swing arm 102 pivotally mounted on handle 18 by a pivot pin 104 and a latch pin 108 affixed to handle 20 and passing through that handle 20 to extend outwardly of the handle 20 on both sides of that handle. The swing arm 102 includes a proximal end 110 attached to the pivot pin 104 and a split distal 112 having a first side portion 114 which is located on the entrance side of the tool 10, and a second side portion 116 which is located on the exit side of the tool 10. As can be seen by comparing FIGS. 1 and 2, the handle 20 is sandwiched between the first side portion 114 and the second side portion 116 when the lock 100 is closed. Arcuate slots 120 are defined in the swing arm distal end side portions 112 and 114 and extend from a swing arm edge 124 along an arc centered at a position which is near the pivot pin 104 when the swing arm is mounted on that pivot pin 104 so the slots 120 in each side portion 114 and 116 are oriented to properly and smoothly receive the latch pin 108 during a lock closing operation. The swing arm 102 is weighted and mounted to be biased to swing into a latch pin engaging position to close lock 100 when the jaw portions 12 and 14 of the tool 10 are closed sufficiently to exert the proper amount of force on piston rings captured in the tool 10. This self-closing feature of the lock 100 permits an assembler to use both hands to manipulate the tool 10 to properly compress piston rings on a piston.

Figure 4:
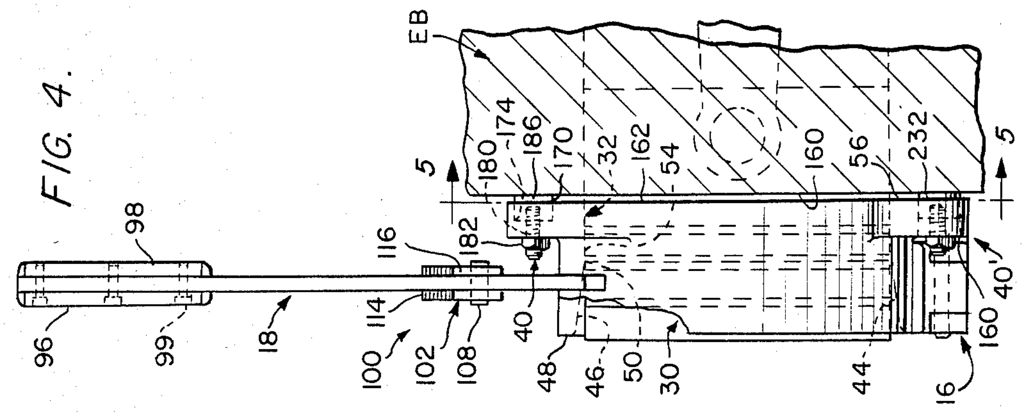
FIG. 4 is a side view of the hand operable tool embodying the teachings of the present invention mounted on an engine block.

The mounting means 40 includes a pair of boot-shaped members 150 and 152 mounted on the jaw portions 12 and 14 respectively. Each of the mounting members 150 and 152 includes a heel section 156 and a toe section 158 with the heel sections of the members 150 and 152 being formed and shaped to be in abuttment when the tool 10 is in the closed configuration. Each of the mounting members 150 and 152 includes a first face 160 located on the entrance side of the tool 10 and a second face 162 located on the exit side of the tool 10, with the face 162 being flush with the exit section rim 56 of the jaw portions 12 and 14 to be located adjacent to an engine block when the tool 10 is in an operative position on the engine block. As best shown in FIGS. 2 and 4, the mounting members 150 and 152 have permanent magnets 170 and 172 respectively mounted thereon in the toe sections 158. The magnets 170 and 172 are cylindrical and are accommodated in bores such as bore 174, defined in the mounting member toe sections 158 and are held in place by fasteners, such as set screw 180 and hex nut 182. The permanent magnets 170 and 172 extend beyond face 162 of each of the mounting members 150 and 152 to have engine block engaging faces 186 which are coplanar with each other and which are spaced from a plane containing the tool exit section 30 so the faces 186 of the magnets 170 and 172 engage an engine block while the exit section 30 of the tool is spaced from that engine block.

Figure 6:
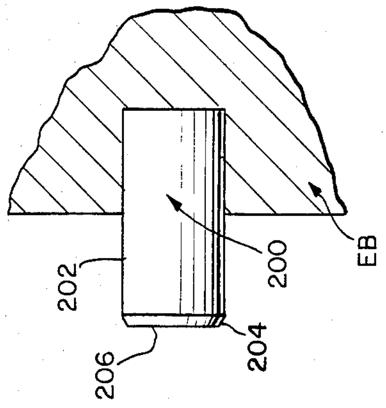
FIG. 6 is a side elevation view of a cylinder head dowel pin mounted on an engine block.

In addition to the magnets 170 and 172, the mounting member 150 of the mounting means 40 includes a hole 190 defined therein adjacent to the heel section 156 of the mounting member 150 to receive a cylinder head dowel pin when the tool 10 is located closely adjacent to an engine block. A bushing 192 having a cylindrical tubular body 194 is securely seated on the mounting member 150 in the hole 190 and is sized to snugly engage a cylinder head dowel pin 200 at the outer side surface 200 of that engine dowel pin 200. There are a plurality of cylinder head dowel pins 200, and, as best shown in FIG. 6, each of the cylinder head dowel pins 200 includes a chamfer 204 which extends from distal end 206 of the cylinder head dowel pin 200 to the outer side surface 202 thereof and defines a diameter less than the diameter defined by the inner surface of body 194 of the bushing 192. The purpose of this relative sizing for the bushing 192 and the engine dowel pins 200 will be discussed below.

The mounting means 40′ includes boot-shaped mounting members 220 and 222 located on the tool 10 adjacent to the hinge 16. The mounting member 222 includes a toe section 224 having a cylinder head dowel pin receiving hole 226 defined therein and a heel section 228 located to be adjacent to the end edges 62 of the jaw portions 12 and 14 when the tool 10 is closed. The mounting member 220 includes a toe section 230 having a permanent magnet 232 mounted thereon in a manner similar to the above-disclosed mounting of the magnets 170 and 172 on the mounting members 150 and 152. The mounting member 220 further includes a heel section 236 located to be adjacent to the end edges 62 of the jaw portions 12 and 14 when the tool 10 is closed. The magnet 232 is cylindrical, is similar to the magnets 170 and 172 and includes an engine block engaging face 240 which is coplanar with engine block engaging faces 186 of the permanent magnets 170 and 172 and is spaced from the plane containing the exit section 30 of the tool 10 a distance equal to the spacing between the engine block engaging faces 186 of the magnets 170 and 172 and the exit section rim 56 so all of the magnets 170, 172 and 232 can engage the engine block and hold the tool 10 so that the plane containing the exit section rim 56 of the tool 10 is parallel to the engine block surface to which the tool is secured.

The mounting member 222 has a bushing 246 seated thereon in the cylinder head dowel pin receiving hole 226 The bushing 246 includes a cylindrical tubular body 248 which engages the outers side surface 202 of a cylinder head dowel pin 200 in a member similar to that discussed for the engagement of a cylinder head dowel pin 200 in the bushing 192 located in engine dowel pin receiving hole 190.

Figure 5:
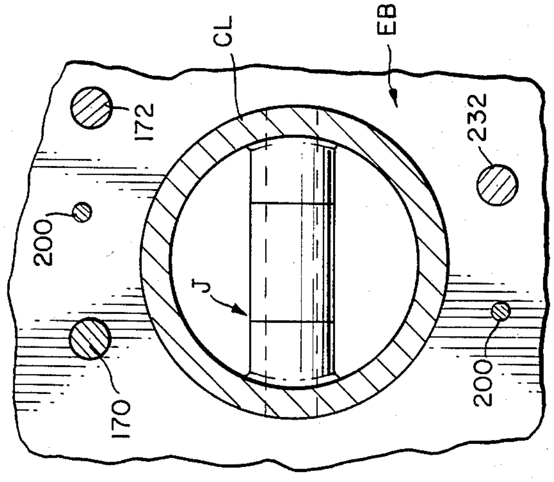
FIG. 5 is a view taken along line 5—5 of FIG. 4.

As can be seen in the figures, and in particular, FIGS. 1 and 5, with respect to a closed tool 10, the engine dowel pin receiving hole 190 is on one side of a line extending through jaw portion end edges 60 and along a diameter of such a closed tool, and the engine dowel pin receiving hole 226 is on the other side of that line. As will be evident from this disclosure, such relative positioning of the engine dowel pin receiving holes 190 and 226 contributes to the stability with which a tool 10 is held affixed to an engine block.

The permanent magnets 170, 172 and 232 attach the tool 10 to the engine block and are powerful enough to strongly attract the tool 10 toward that engine block when the tool 10 is positioned near the cylinder head dowel pin distal ends 206 but is still spaced from the engine block. Since the distal ends of the cylinder head dowel pins 200 are chamfered, there is some margin of error for the alignment of the tool 10 with respect to these cylinder head dowel pins 200. However, once the cylinder head dowel pins 200 are received in the bushings 192 and 246, and the tool 10 is moved toward the engine block manually and under the influence of the magnets 170, 172 and 232, the cylinder head dowel pin outer side surfaces 202 will engage the bushing tubular bodies 194 and 248 to move the tool 10 into a precise and exact orientation and position on the engine block. Thus, the engine dowel pin receiving holes 190 and 226 are machined in the mounting members 150 and 220 at positions on the movable jaw portions 12 and 14 to cause those jaw portions 12 and 14 to be precisely and accurately located and oriented with respect to an engine block cylinder bore when cylinder head dowel pins 200 are fully engaged and received in the bushings 192 and 246 mounted in those dowel pin receiving holes 190 and 232.

It is, therefore, clear from the foregoing disclosure that the mounting means magnets 170, 172 and 232 secure the tool 10 to the engine block, and, while the tool 10 is being thus secured, that tool 10 is being accurately and precisely oriented and positioned relative to the engine block cylinder bore by the engagement of cylinder head dowel pins 200 and the bushings 192 and 246. In this manner, mounting means 40, 40′ effects accurate and precise orientation and positioning as well as secure attachment of the tool on the engine block in one movement of the tool 10. Thus, an assembler need only move the tool 10 into an approximate position and orientation with respect to an engine block cylinder bore, then allow the magnets 170, 172 and 232 and the bushings 192 and 246 to guide the tool 10 into the proper position and orientation on the engine block, as the engagement of cylinder dowel pins 200 in the bushings 192 and 246 corrects any errors in alignment, orientation and positioning of the tool 10 with respect to the desired alignment, orientation and position on the engine block. Once the tool 10 is secured to the engine block, the assembler's hands are completely free to carry out other tasks associated with the installation of a piston assembly into an engine block. Furthermore, accurate and precise alignment and orientation of tool 10 on the engine block is not dependent on the skill, eye or dexterity of the assembler, and an unskilled worker can produce extremely accurate and precise placement of tool 10 with the same facility as can a skilled assembler. In fact, an unskilled worker can orient and locate the tool 10 with respect to an engine block cylinder bore to within a tolerance of plus or minus axes system having an origin at the center of an engine block cylinder bore and being located in a plane containing the engine block surface to which the tool 10 is attached.

Figure 7:
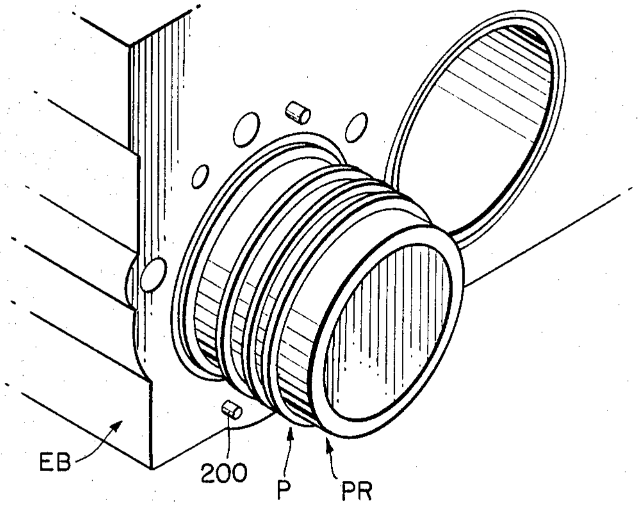
FIGS. 7-9 are schematics illustrating steps included in a method of installing a piston-piston rod assembly in an engine block embodying the teachings of the present invention.
Figure 8:
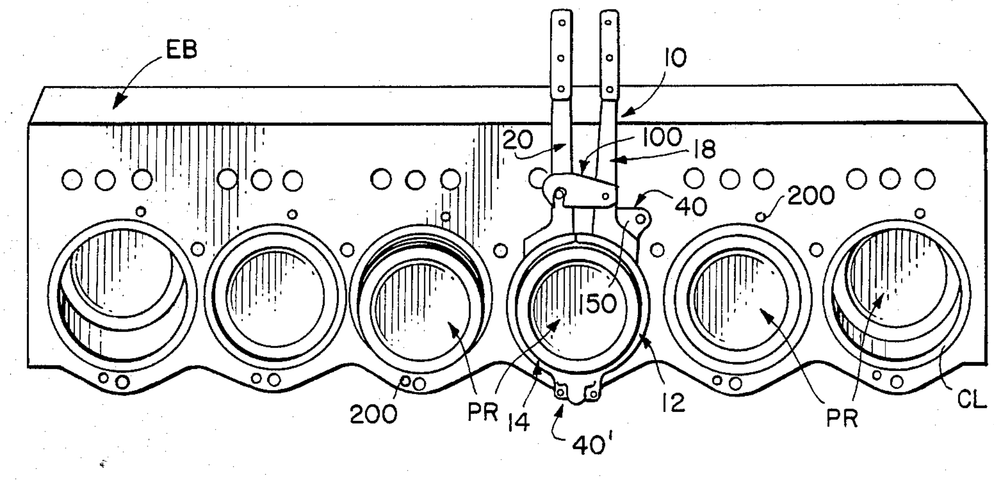
Figure 9:
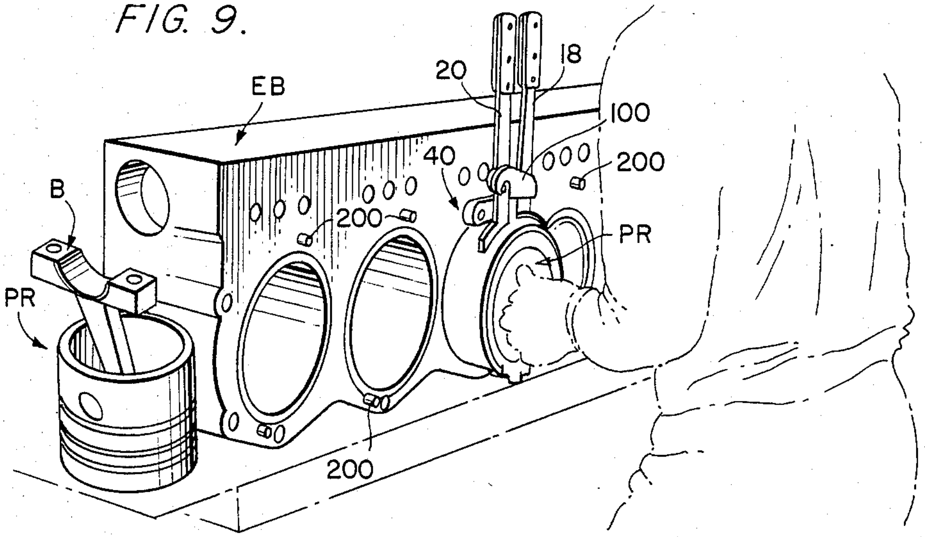

The installation of a piston and piston rod assembly into an engine block EB having a cylinder liner CL is illustrated in FIGS. 7–9, and attention is directed thereto. A plurality of piston and piston rod assemblies PR can be located convenient to an assembler and can be placed in an engine block EB by hand. The assemblies are shown in FIG. 9 to be next to an engine block EB, but can be in any other convenient location as necessary. The assemblies PR can be left resting on the engine block EB while the other steps are carried out if necessary as indicated in FIG. 7. Piston rings P of placed piston assemblies PR are lubricated and positioned, and a tool 10 is positioned with the jaw portions 12 and 14 thereof surrounding the piston and piston rings of the piston rod assembly PR. The tool 10 is closed by manually moving the handles 18 and 20 together until the self-closing lock 100 closes to lock the tool in a piston ring compressing configuration.

The tool 10 with a piston assembly PR therein is moved toward the engine block EB, and the magnets 170, 172 and 232 pull the tool toward the engine block EB while the cylinder headed dowel pins 200 engage the bodies of bushings 192 and 246 to accurately and precisely orient and position the tool 10 and the piston assembly PR with respect to the engine block cylinder bore. The magnets then secure the tool 10 to the engine block EB, and the assembler is not required to hold onto the tool 10 so his hands are free for other tasks.

As shown in FIG. 9, the assembler then presses the piston and piston rod assembly PR into the engine block cylinder liner CL by hand via the tool 10 which causes the piston rings P to be gradually compressed as the piston passes through the tapered bore defined by the closed jaw portions 12 and 14 of the closed tool 10. The piston assembly PR is inserted into the engine block cylinder bore to a proper position with a connecting rod bearing B seated on a crankshaft journal J (FIG. 5), and rod cap bolts (not shown) are then torqued into position to complete the installation of the piston and rod into the engine block EB.

INDUSTRIAL APPLICABILITY

This invention has particular utility to the installation of piston assemblies into an engine block of a diesel engine and, most specifically, a Cummins K series engine manufactured by the Cummins Engine Co. of Columbus, Ind., but can be useful for installing pistons in an engine block of any combustion engine. Furthermore, the hand operable tool embodying the present invention can be used in the installation of piston assemblies in engine blocks wherein the engine block piston cylinder is not horizontally oriented during the installation process, and the engine block cylinder bore can be oriented so the piston assembly is vertically oriented during the installation process as well as any orientation between horizontal and vertical without departing from the scope of the present disclosure. Other types of securing means can be used in place of the permanent magnets, such as electromagnets, or the like, also without departing from the scope of the present disclosure.

I claim:

1. A hand operable tool used in manually installing a piston assembly including a piston and piston mounted piston rings in an engine block of a combustion engine comprising:

a pair of movable jaw portions adapted to move from an open piston to receive the piston assembly to a closed position to surround the piston mounted piston rings;

dowel pin receiving means on said movable jaw portions for attaching said movable jaw portions to an engine block of a combustion engine and for accurately orienting, locating and supporting said movable jaw portions with respect to an engine block cylinder bore;

at least one permanent magnet means on said movable jaw portions for attaching said movable jaw portions to an engine block in a stable manner; and handle means for moving said movable jaw portions between said open and closed positions.

2. The hand operable tool defined in claim 1 wherein said movable jaw portions include a guiding surface for engaging the piston mounted piston rings, said guiding surface being tapered to compress the piston mounted piston rings as the piston assembly is moved into the engine block cylinder bore.

3. The hand operable tool defined in claim 1 wherein said means for moving said movable jaw portions includes a handle attached to each movable jaw portion.

4. The hand operable tool defined in claim 3 wherein said means for moving said movable jaw portions has a self-closing lock mounted thereon.

5. The hand operable tool defined in claim 4 wherein said self-closing lock includes a swing arm pivotably mounted on one handle and a latch pin mounted on another handle, said swing arm having a latch pin receiving means and being biased into a latch pin engaging position.

6. The hand operable tool defined in claim 1 wherein said guiding surface is coated with a friction and wear reducing means.

7. The hand operable tool defined in claim 6 wherein said friction and wear reducing means includes a layer of chrome plating.

8. The hand operable tool defined in claim 1 further including a hinge means coupling said movable jaw portions together.

9. The hand operable tool defined in claim 1 wherein said mounting means includes a plurality of permanent magnets mounted on said movable jaw portions.

* * * * *